STUART N. PRICE
INVENTOR.

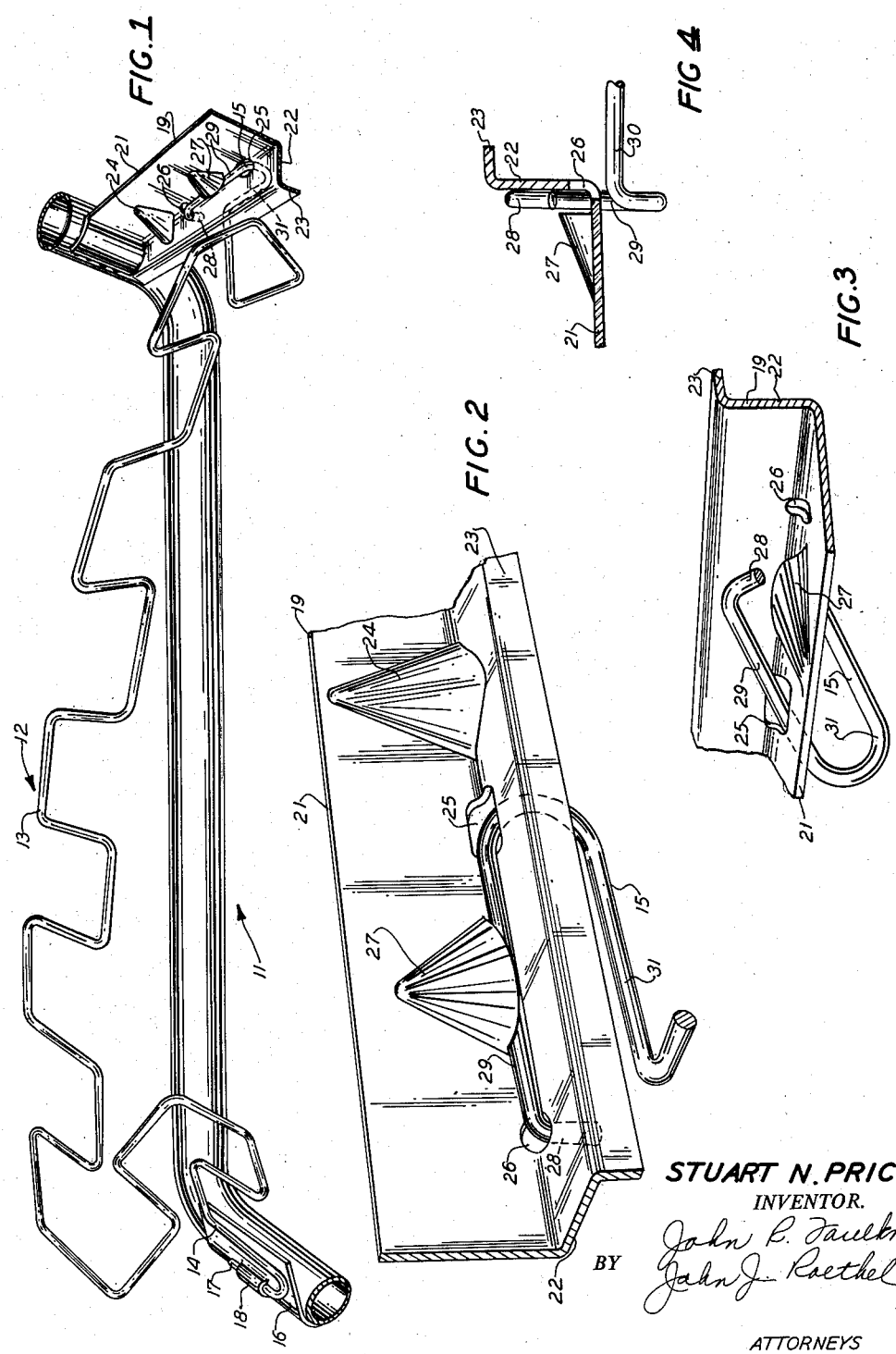

BY John P. Faulkner
John J. Roethel

ATTORNEYS

United States Patent Office 3,106,389
Patented Oct. 8, 1963

3,106,389
SEAT SPRING RETAINER
Stuart N. Price, Dearborn, Mich., assignor to Ford Motor Company, Dearborn, Mich., a corporation of Delaware
Filed Oct. 24, 1960, Ser. No. 64,377
4 Claims. (Cl. 267—107)

This invention relates to seat structures utilizing wire springs and more particularly to a structure for securing such springs to their supporting frames.

It is necessary in wire spring seat structures to provide a retaining connection between the spring ends and the spring supporting frame. The connection should, however, be one which will allow easy assembly and also one which can be readily disassembled in the event it becomes necessary to replace the spring.

Constructions have been proposed in which the spring supporting frame is provided with a series of holes through which the retaining end of the spring is laced to secure it in place. This type of construction has the advantage of being easy to assemble. This easy assembly advantage is often obtained at some sacrifice to the degree of positiveness with which the retained end of the spring is coupled to the supporting frame. In this type of construction there is a tendency for the retained end of the spring to work free from its supporting frame as the spring is subjected to loading from various directions.

It is an object of this invention, therefore, to provide a spring retaining structure in which the spring retaining end and its frame may be easily assembled and disassembled and one in which the end of the spring will not work loose regardless of the direction of the loads imposed upon the spring.

In this invention the spring supporting frame is formed with a pair of holes and has a projection formed between the holes which extends outward of one side of the frame. The spring retaining end is laced through these holes and the frame projection acts against a section of the retaining portion to resist any tendency for the spring to leave the holes.

Figure 5:
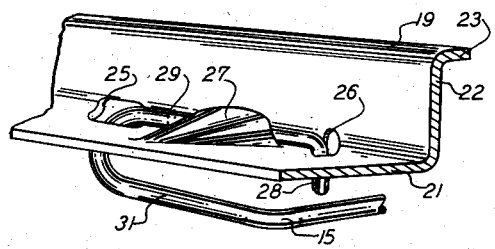
Figure 6:
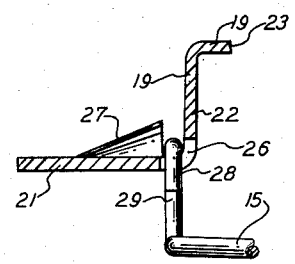
Figure 7:
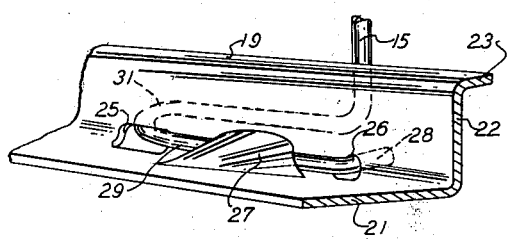
Figure 8:
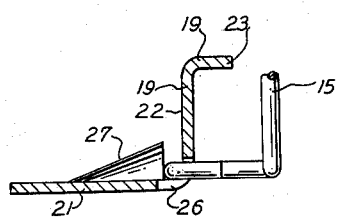

Further objects and advantages of this invention will become more apparent as this description proceeds, particularly when considered in connection with the accompanying drawings in which:

FIGURE 1 is a perspective view of a portion of a seat assembly showing a spring and its supporting frame;

FIGURE 2 is an enlarged perspective view showing a retaining portion of the spring laced through the supporting frame; and FIGURES 3–8 show the spring retaining portion and supporting frame as they appear during various stages of assembly, FIGURES 3, 5 and 7 being inverted perspective views and FIGURES 4, 6 and 8 being cross sectional end views corresponding to FIGURES 3, 5 and 7 respectively.

Referring now to the drawings and in particular to FIGURE 1, there is shown a portion of the spring assembly of a seat structure. The seat frame, shown generally at 11, is illustrated as being a one piece tubular construction. Frame 11 supports a plurality of elongated zig zag wire springs 12 (only one of which is shown). Spring 12 has a load supporting portion 13 and retaining end portions 14 and 15. At one end spring 12 is retained relative to the frame 11 by retainer 16 which is suitably secured to the frame 11. Offset end 17 of spring retainer portion 14 extends through stirrup 18 formed in retainer 16. At its other end, spring 12 is retained relative to the seat frame 11 by the coaction of spring retainer portion 15 with frame member 19. Member 19 is secured to the tubular frame 11 at each side thereof as by welding.

Referring now to FIGURE 2, there is shown in detail the spring retaining construction to which this invention relates. Frame member 19 is a substantially L-shaped member having two angularly related leg portions 21 and 22. If increased rigidity of the frame member 19 is desired, a flange 23 may be added to give frame member 19 a substantially Z-shaped cross section. In addition, member 19 may be formed with a plurality of embossed projections 24 (only one of which is shown) along its length. These projections serve to further increase the rigidity of frame member 19. Frame member 19 is provided at intervals with spaced pairs of holes 25 and 26 located at the juncture of leg portions 21 and 22 through which the retainer portion 15 of each spring 12 is laced. An embossed projection 27 extending outwardly of one side of frame member 19 is provided on leg 21 between each pair of holes 25 and 26. Projection 27 has a face portion thereof which is adjacent to but in spaced, substantially parallel relationship to the inner face of leg 22. This projection coacts with the retainer end 15 of spring 12 to hold it securely in place in a manner which will be made more apparent as this description proceeds.

It will be noted that the retainer end portion 15 of spring 12 is made up of three substantially straight angularly related sections 28, 29 and 31 connected by generally arcuate sections. The sections 28, 29 and 31 lie in a common plane that is normal to the load supporting portion 13. This end of the spring is laced into the holes 25 and 26 in frame member 19 in a manner now to be described. As shown in FIGURES 3 and 4, sections 28 and 29 of retainer portion 15 are inserted through hole 25 in frame member 19. It should be noted that hole 25 is elongated to allow sufficient clearance for this operation. Section 28 of retainer portion 15 is then inserted through the hole 26 as shown in FIGURES 5 and 6. This brings section 29 into the corner formed by the intersection of the two frame member leg portions 21 and 22. The spring retainer portion 15 is then rotated through 90 degrees so that the spring section 28 extends away from and perpendicular to the face of projection 25. This position is shown in FIGURES 7 and 8 as well as FIGURES 1 and 2. The holes 25 and 26 being at the intersection of the leg portions 21 and 22 makes this rotation possible.

The retainer end 15 of spring 12 in its finally assembled position, shown in FIGURES 1, 2, 7 and 8, has sections 28 and 31 extending on one side of frame member 19 and section 29 extending on the other side of frame member 19. Section 28 extends away from the load supporting section 13 of spring 12. Therefore, any loads normally imposed on the spring 12 will not produce any tendency for section 28 to leave hole 26. Any load which might tend to cause this section to leave hole 26 also would be resisted by the action of extension portion 27 on section 29. Spring retaining portion 15 is thereby positively located relative to frame member 19 at all times.

It will be understood that this invention is not to be limited to the exact construction shown and described but that various changes and modifications may be made without departing from the spirit and scope of the invention, as defined in the appended claims.

I claim:

1. In combination, a frame member having a related pair of holes formed therein and an intermediate portion thereon extending outwardly of one side of said frame member, and a spring having a supporting portion and a retaining portion coacting with said frame member, said retaining portion comprising a first section extending on the other side of said frame member, a second section extending on said one side of said frame member, said first and said second sections being connected by a generally arcuate section which passes through one of said holes in said frame, a third section extending on said other side of said frame member, said second and said third sections being connected by a generally arcuate portion which passes through the other of said holes in said frame member, said outwardly extending portion of said frame member coacting with said second section of said spring retaining portion whereby said spring is restrained against movement in at least one direction relative to said frame.

2. In combination, a frame member having holes formed therein and an intermediate portion thereon extending outwardly of one side of said frame member, and a spring having a supporting portion and a retaining portion connecting with said frame member, said retaining section comprising a first substantially straight section extending on the other side of said frame member generally away from said spring supporting portion, a second substantially straight section angularly related to said first section and extending on said one side of said frame member, said first and said second sections being connected by a generally arcuate section which passes through one of said holes in said frame, a third section extending on said one side of said frame, said second and said third sections being connected by a generally arcuate section which passes through another of said holes in said frame member, said third spring retaining section extending into said spring supporting portion, said outwardly extending portion of said frame member coacting with said second section of said spring retaining portion whereby said spring is restrained against movement in at least one direction relative to said frame.

3. In combination, a frame member having angularly related leg portions, said frame member having holes formed therein, a projection formed on one of said leg portions extending outwardly of one side of said frame member and presenting a face portion thereof adjacent to and substantially parallel with said other leg portion, and an elongated wire spring having a supporting portion and a retaining portion coacting with said frame member, said retaining portion consisting of a first section extending on the other side of said frame member, a second section connected to said first section by a generally arcuate section which passes through one of said holes in said frame member, a third section extending on the other side of said frame member, said third section being connected to said second section by a generally arcuate section which passes through another of said holes in said frame member, said third section extending into said spring supporting portion, said face portion of said projection abutting said spring retaining portion whereby said spring member is restrained against movement in at least one direction relative to said frame member.

4. In combination, a frame member having angularly related leg portions, said frame member having at least a pair of holes formed therein at the intersection of said leg portions, a projection formed on one of said leg portions extending outwardly of one side of said frame member and presenting a face portion thereof adjacent to and substantially parallel with said other leg portion, said projection being spaced between said holes, and an elongated wire spring having a supporting portion and a retaining portion coacting with said frame member, said retaining portion consisting of a first substantially straight section extending on the other side of said frame member generally away from said supporting portion, a second substantially straight section angularly related to said first section and connected thereto by a generally arcuate section which passes through one of said holes in said frame member, said second section of said spring supporting portion being adjacent to the intersection of the leg portion of said frame member, a third section extending on the other side of said frame member, said third section being connected to said second section by a generally arcuate section which passes through the other of said holes in said frame member, said third section extending into said spring supporting portion, said face portion of said frame projection abutting said second spring retaining section whereby said spring retaining member is restrained against movement in at least one direction relative to said frame member, the location of said holes in said frame member at the intersection of said leg portions facilitating installation of said spring supporting portion into said frame member.

References Cited in the file of this patent

UNITED STATES PATENTS

| | | |
|---|---|---|
| 2,669,290 | Neely | Feb. 16, 1954 |
| 2,830,654 | Neely | Apr. 15, 1958 |
| 2,849,056 | Flint, et al. | Aug. 26, 1958 |
| 2,856,989 | Pawlikowski | Oct. 21, 1958 |
| 2,870,823 | Staples | Jan. 27, 1959 |